United States Patent [19]
Cadet

[11] 4,326,975
[45] Apr. 27, 1982

[54] PROCESS FOR STORING HEAT WITH A EUTECTIC COMPOSITION CONTAINING AT LEAST ONE SATURATED ALIPHATIC HYDROCARBON AND AT LEAST ONE FATTY ACID

[75] Inventor: André Cadet, Le Havre, France

[73] Assignee: Compagnie Française de Raffinage, Paris, France

[21] Appl. No.: 166,795

[22] Filed: Jul. 8, 1980

[30] Foreign Application Priority Data

Jul. 11, 1980 [FR] France .............................. 79 17972

[51] Int. Cl.$^3$ .................................................. C09K 5/06
[52] U.S. Cl. ........................................ 252/70; 106/268;
106/295; 126/400; 165/104.21
[58] Field of Search ......................... 252/70; 106/268;
126/400; 165/104 S

[56] References Cited

U.S. PATENT DOCUMENTS

| | | | |
|---|---|---|---|
| 2,726,211 | 12/1955 | Schaefer | 252/70 |
| 3,356,828 | 12/1967 | Furness | 252/71 X |
| 3,823,089 | 7/1974 | Ryan et al. | 252/70 |
| 4,162,671 | 7/1979 | Christy | 252/75 |
| 4,221,259 | 9/1980 | Ronc et al. | 252/70 X |
| 4,223,721 | 9/1980 | Schuenfelder | 252/70 X |

OTHER PUBLICATIONS

Allen et al., "A Study of Selected Thermal Energy Storage Materials by Differential Thermal Analysis", Proc. Annu. Meet.-Am. Sect. Int. Sol. Energy Soc. 1978, 2(1), 660–663, CA 91:76856h.

Primary Examiner—Mayer Weinblatt
Attorney, Agent, or Firm—Martin Smolowitz

[57] ABSTRACT

Heat, particularly solar heat, is stored by a eutectic composition containing at least one saturated aliphatic hydrocarbon and at least one fatty acid having at least 10 carbon atoms.

5 Claims, 2 Drawing Figures

PROCESS FOR STORING HEAT WITH A EUTECTIC COMPOSITION CONTAINING AT LEAST ONE SATURATED ALIPHATIC HYDROCARBON AND AT LEAST ONE FATTY ACID

BACKGROUND OF THE INVENTION

The present invention concerns a process for storing heat with compositions containing at least one saturated aliphatic hydrocarbon.

The problem posed in storing heat from a source which furnishes heat energy only in an intermediate manner has been the object of numerous studies. This is particularly true for storing heat of solar origin, which it is desirable to be able to use in periods other than during sunshine, for example at night.

Among the materials which can be used as reserves for heat, there have been proposed materials which store heat without changing physical state, notably water. In this case, it is the specific heat which is utilized.

It has also been proposed to use materials which change state during storage; these are materials with a high latent heat of fusion, such as hydrates of salts, e.g. the hydrate of sodium sulphate $Na_2SO_4 \cdot 10\ H_2O$, or paraffinic hydrocarbons which are solid at ambient temperature. In this case it can further be a question of a well defined paraffinic hydrocarbon or a mixture of hydrocarbons.

The use of such paraffinic hydrocarbons however makes it necessary that they have particular properties, notably;

a sufficiently low melting point;

a well defined melting point, in the case of mixtures, because the difference in density between the solid phase and the liquid phase creates a separation which reduces the usable latent heat;

a high chemical inertness to avoid corrosion of equipment.

These particular properties are not always possessed by the available paraffinic hydrocarbons and notably mixtures of hydrocarbons derived from the refining of crude petroleum.

The work carried out by the Applicant has enabled him to conceive of a means for facilitating the use of saturated aliphatic hydrocarbons for the storing of heat. The object of the present invention is therefore the storing of heat with saturated aliphatic hydrocarbons.

SUMMARY OF THE INVENTION

The invention has as its object a process for the storing of heat by a composition containing at least one saturated aliphatic hydrocarbon, said process being characterized in that the composition utilized for the storing of heat contains, in addition, at least one fatty acid selected from the group consisting of fatty acids having at least ten carbon atoms to form a eutectic composition. In the process according to the present invention, the saturated aliphatic hydrocarbon or the mixture of saturated aliphatic hydrocarbons, used in the composition for the storing of heat, can have a melting point equal to or greater than 20° C.

It can concern particularly products obtained by the refining of crude petroleum and known under the name of "paraffin wax", "microcrystallin wax" and "petrolatum".

"Paraffin wax" (as used herein) comprises a mixture of saturated hydrocarbons having a crystalline structure and whose melting point lies between 35° C. and 66° C.; the major part of the "paraffin wax" consists of linear saturated aliphatic hydrocarbons; the oil content is generally less than 5% by weight and, preferably, less than 1%. "Microcrystallin wax" is a mixture of saturated hydrocarbons of molecular weights higher than paraffin wax (microcrystallin wax); has more cyclic and branched molecules and is also richer in oil than paraffin wax, (microcrystallin wax); is amorphous, its melting point lying between 66° and 100° C.

"Petrolatum" (slack wax) is a mixture of saturated hydrocarbons obtained during the preparation of "paraffin or microcrystallin wax" by removal of paraffin hydrocarbons) from oil. It can contain up to 25% of oil and have a melting point between 20° and 50° C.

The saturated hydrocarbon or the mixture of saturated hydrocarbons can contain antioxidants such as, for example, butylhydroxyanisole or butylhydroxytoluol.

The compositions which can be used in the process according to the invention contain, in addition, at least one fatty acid or a mixture of such acids, whose nature and percentage by weight in the composition vary according to the nature of the hydrocarbon or the mixture of hydrocarbons in the composition.

The fatty acid can have a number of carbon atoms equal to or greater than 10 and can be, for example, selected from the group consisting of stearic acid, palmitic acid, and capric acid. The fatty acid, or mixture of fatty acids, can be pure or more or less purified; it can contain notably starting materials from which it has been prepared.

The addition of a fatty acid, or of a mixture of such acids, to the saturated hydrocarbon or to the mixture of such hydrocarbons, permits the formation of a eutectic composition having a melting point lower than the acid and the hydrocarbon, this melting point being in addition well defined.

The choice of the constituents of the composition to be used and the amount of these constituents will depend on the intended application and on the use temperature of the composition.

The process according to the invention can be particularly applied to the storing of heat of solar origin.

BRIEF DESCRIPTION OF THE DRAWINGS

FIG. 1 is a partial section of the roof of a building.

FIG. 2 is a schematic diagram which shows solar energy collected by a solar collector.

DETAILED DESCRIPTION

Figure 1:
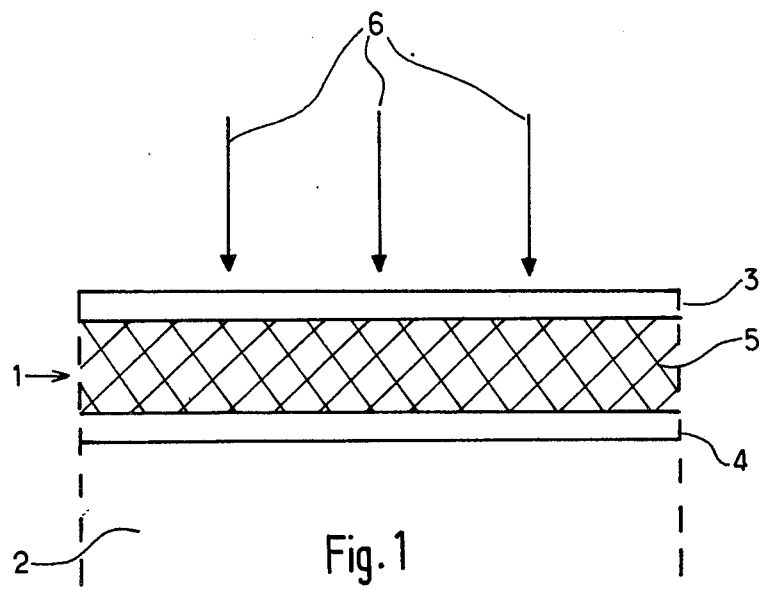
FIGS. 1 and 2 represent, by way of a non-limiting example, arrangements for putting the process according to the invention into practice for application to the storing of heat of solar origin.

In FIG. 1, the roof 1 of a building 2 consists of two glass plates 3 and 4, between which is disposed a composition 5 conforming to the invention and which contains:

45% by weight of a "paraffin wax" obtained from the refining of crude petroleum and having a melting point in the neighborhood of 53° C., 55% by weight of commercial grade stearic acid, having a melting point in the neighborhood of 53° C.

The composition itself has a melting point of 42° C.

During periods of sunshine, the solar radiation represented by the arrows 6 is transformed into heat by means of the plate 4. This heat is absorbed by the composition 5. At times other than periods of sunshine, the composition 5 gives back its latent heat to the building 2.

Figure 2:
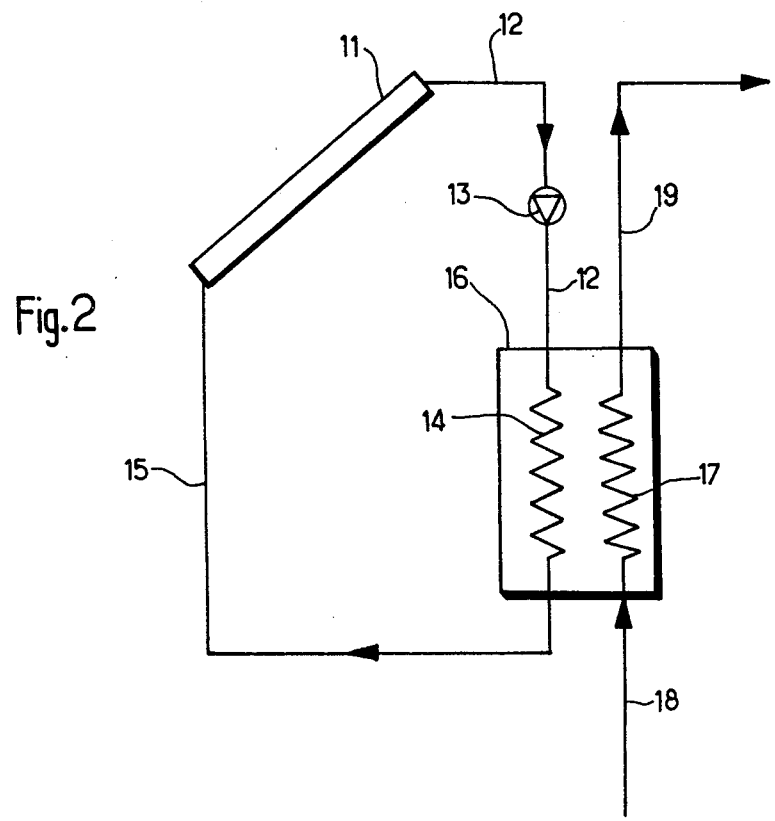

In FIG. 2 the solar energy is collected by a solar collector 11. In this collector there circulates a heat transfer fluid such for example, water containing antifreeze. This fluid, after passing through the solar collector where it is reheated during periods of sunshine, is led by line 12, provided with a circulating pump 13, into a heat exchanger 14. The fluid leaves this heat exchanger through line 15, which leads it to back to the solar collector. The heat exchanger 14 is placed in a heat storing containing 16, containing a "paraffin wax" and stearic acid composition identical to that described above with reference to FIG. 1.

The solar heat is stored by this composition. This heat can be utilized for the production of sanitary hot water as shown in FIG. 2. For this purpose, the container 16 is equipped with a heat exchanger 17, fed by cold water through line 18. After reheating in heat exchanger 17, the reheated water leaves the container 16 through line 19 to be led to the location where it is to be used.

The solar heat is stored by the composition contained in the container 16 during periods of sunshine, to be transferred to the water of the heat exchanger 17 when the latter is drawn off. When the heat furnished by solar energy is not sufficient, the water from line 19 can undergo a second reheating by an auxiliary source of heat (electricity, or oil or gas burner), as described in the example in French Pat. No. 2,403,524, in the name of the assignee.

I claim:

1. A process for storing solar heat by absorption of said heat in a eutectic composition comprising at least one or a mixture of saturated aliphatic hydrocarbons and at least one fatty acid selected from the group consisting of fatty acids having at least 10 carbons atoms wherein the saturated hydrocarbon or mixture of saturated hydrocarbons has a melting point equal to or greater than 20° C. and wherein the fatty acid is selected from the group consisting of stearic acid, palmitic acid and capric acid.

2. The process according to claim 1, wherein the mixture of hydrocarbons is paraffin wax.

3. The process according to claim 1, wherein the mixture of hydrocarbons is microcrystalline wax.

4. The process according to claim 1, wherein the mixture of hydrocarbons is petrolatum.

5. The process according to claim 1, wherein the composition comprises a mixture of paraffin wax and stearic acid, said mixture having a melting point of 42° C.

* * * * *